(12) United States Patent
Hilbert et al.

(10) Patent No.: US 8,941,847 B2
(45) Date of Patent: Jan. 27, 2015

(54) MOBILE SCAN SETUP AND CONTEXT CAPTURE PRIOR TO SCANNING

(75) Inventors: David M. Hilbert, Palo Alto, CA (US); Ram Sriram, Saratoga, CA (US); Yukiyo Uehori, Los Altos, CA (US); Kandha Sankarapandian, Palo Alto, CA (US); John Adcock, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 225 days.

(21) Appl. No.: 13/559,480

(22) Filed: Jul. 26, 2012

(65) Prior Publication Data
US 2014/0029032 A1 Jan. 30, 2014

(51) Int. Cl.
*G06F 15/00* (2006.01)
(52) U.S. Cl.
USPC ........................................................ 358/1.13
(58) Field of Classification Search
USPC ........................................................ 358/1.13
See application file for complete search history.

(56) References Cited

U.S. PATENT DOCUMENTS

| 6,799,717 | B2 | 10/2004 | Harris |
| 7,996,439 | B2 | 8/2011 | Foygel |
| 8,139,860 | B2 | 3/2012 | Liu et al. |
| 2009/0228380 | A1* | 9/2009 | Evanitsky ................ 705/31 |
| 2012/0154842 | A1* | 6/2012 | Hori ......................... 358/1.13 |

OTHER PUBLICATIONS

U.S. Appl. No. 13/186,432, filed Jul. 19, 2011.
U.S. Appl. No. 13/093,661, filed Apr. 25, 2011.
"Canon extends uniFLOW platform to mobile devices," Sep. 19, 2011 on http://www.canon-europe.com/About_Us/Press_Centre/Press_Releases/Business_Solutions_News/2H11/Canon_extends_uniFLOW_platform_to_mobile_devices.aspx.

* cited by examiner

*Primary Examiner* — Saeid Ebrahimi Dehkordy
(74) *Attorney, Agent, or Firm* — Sughrue Mion, PLLC (57) ABSTRACT

Example embodiments described herein are directed to utilizing image matching technology to allow people to use their mobile device to setup scan workflows (or "Scan Flows") in advance of a future scanning operation. Using an application on a mobile device, the user takes a photo of the first page of a document that he/she will scan at some later time and associates the image of the document with a simple workflow (e.g., where to store the document once the document has been scanned). Additional workflow actions may include automatic document sharing and notification, automatic document segmentation, and automatic document cropping.

20 Claims, 9 Drawing Sheets

MOBILE SCAN SETUP AND CONTEXT CAPTURE PRIOR TO SCANNING

BACKGROUND

1. Field

Example embodiments described herein are generally directed to multi-function device technology, and more specifically, to mobile scan setup and context capture.

2. Related Art

Modern multifunction scanner-printer-copier devices (MFDs) are devices that can perform several functions, but are hampered by a) being large, fixed, non-mobile assets, and b) having inconvenient user interfaces due to the multi-functionality of the device. Because MFDs tend to be large, fixed non-mobile devices, a user may delay for hours, days or weeks before approaching an appropriate MFD to scan a document. The user may forget to scan needed documents if the MFD is not conveniently located.

Further, because MFDs need to support several different functions, the user interfaces may be inconveniently complex. The ease of use of such a user interface is further hampered if the user has to stand in front of the MFD to perform complex interactions with the device.

Related art systems can perform automatic routing of document faxes or scans using cover sheets with machine readable metadata. However, there is no routing in the related art based on ad hoc matching of document images without cover sheet generation or inclusion of a document in a document management system prior to the performed scan.

SUMMARY

Aspects of the example embodiments involve a computer readable storage medium storing instructions for executing a process. The instructions may include associating a workflow with an image of at least a portion of a first document; determining whether the image is associated with at least a portion of a second document undergoing a scan process; and triggering an execution of the workflow for the second document undergoing a scan process when the image is determined to be associated with at least the portion of the second document undergoing the scan process.

Additional aspects of the example embodiments include a server, that may involve an associating unit configured to associate a workflow to an image of at least a portion of a first document; a determining unit configured to determine if the image is to be associated with at least a portion of a second document undergoing a scan process; and a triggering unit configured to trigger an execution of the workflow for the second document undergoing the scan process when the image is associated with the portion of the second document undergoing the scan process.

Additional aspects of the example embodiments include a multi-function device, which may involve a determining unit configured to determine if at least a portion of a second document undergoing a scan process is associated with an image of at least a portion of a first document; and a triggering unit configured to trigger an execution of a workflow associated with the image for the second document undergoing the scan process, when the image is associated with the second document undergoing the scan process.

Additional aspects of the example embodiments include a multi-function device, which involves a downloading unit configured to download preset workflows for implementation on a document undergoing a scan process; and an execution unit configured to execute one of the preset workflows after the document is scanned.

DETAILED DESCRIPTION

Example embodiments utilize image matching technology to allow people to use their mobile device to setup workflows responsive to a scan (or "Scan Flows") ahead of time. Using an application on a mobile device (e.g., a mobile phone, a tablet, etc.), the user takes a photo of the first page of a document that he or she will scan at some later time and associates the captured image with a workflow.

A workflow can be any number of tasks that the user wants to implement on the scanned document, and may include any number of steps for accomplishing the task (e.g., storing the document at one or more particular locations on a server once the document or at least a portion of the document has been scanned, having a document e-mailed to one or more people, sending e-mail reminders to the user to follow up with a person after the document is scanned, etc.). Additional workflow actions could include automatic document sharing and notification, automatic document segmentation, and automatic document cropping.

The documents in the example are not limited to text or paper documents, and can be any form of scannable media, such as photos, posters, etc., and can include one or more pages. Further, the scan process in the multi-function device may include any process for converting a document into a machine-readable form, such as the receipt or sending of faxes, scanning the document into a digital form and/or storing the digital form, creating copies by storing representations of the document into a buffer, and so on.

Additional reviewable information may also be added (e.g., context information, the current time and location, text and/or voice annotations, etc.). When the user later scans the document using a scan device, the scanned images are sent to a system, which may use image matching techniques between the scanned images and the previously stored document snapshot to automatically retrieve the previously defined workflow and contextual information with minimal user interactions with the scan device.

The example embodiments utilize a mobile device with a camera to move some of the interactions associated with scanning and routing a document or documents. The use of the mobile device for a portion of this scanning task may thereby allow the scanning task to be performed at the time and place desired by the user. Further, mobile devices may have a user interface that is more advanced and familiar to the user than the user interface of a MFD.

In an example scenario, a salesperson is visiting customers to review and sign contract documents. After visiting a customer, the salesperson takes a snapshot of the first page of the signed contract with the mobile device and submits a workflow indicating that the scan should to go into the customer's folder. The salesperson also adds reviewable information in the form of a voice memo as a reminder for some issues that the salesperson would like to discuss with the manager upon returning to the office. The salesperson performs a similar process with the second contract when he gets the contract signed at the second customer.

When the salesperson arrives back at the office—hours, days, or even weeks in the future—the salesperson goes to the MFD, places the stack of signed documents on the sheet feeder, logs into and chooses to execute a "Scan Flow" operation. The MFD scans all of the sheets on the feeder, identifies the pages that were captured earlier, separates the multiple documents, and routes the separated multiple documents to the appropriate customer folders.

The salesperson receives a notification on the mobile device confirming the operation and also receives the voice reminders that were recorded by the salesperson in advance. If the salesperson has administrative staff, the salesperson can delegate the scanning operation to the administrative staff, and the scans may be routed correctly without further direction.

Example embodiments utilize network based services to support user authentication, document upload and download, and other data storage and retrieval services such as contacts management and email. These network-based services are accessible from a variety of programmable, network-enabled devices, including MFDs, mobile devices, and desktop and laptop personal computers.

In an example embodiment, a user will logon to the Scan Flow network-based service at the MFD, for instance by entering a username and password. The application on the MFD will then be able to retrieve user-specific settings for MFD operations such as scanning, copying, printing, etc.

Various example embodiments may involve connecting with third party network services requiring authentication, (e.g., to route a scanned document to a personal folder in a document storage system). Any or all of the components in the system (mobile device, MFD, Scan Flow server) may directly connect with a third party service. For the purposes of this example embodiment, the mobile device and MFD communicate directly only with the Scan Flow server, which then can connect with these third party services. Existing connector APIs and methods can be utilized to allow the Scan Flow system to coordinate with third party services, including allowing the user to authorize the Scan Flow system to access the third party service (e.g., for uploading a document into a private folder).

Figure 1:
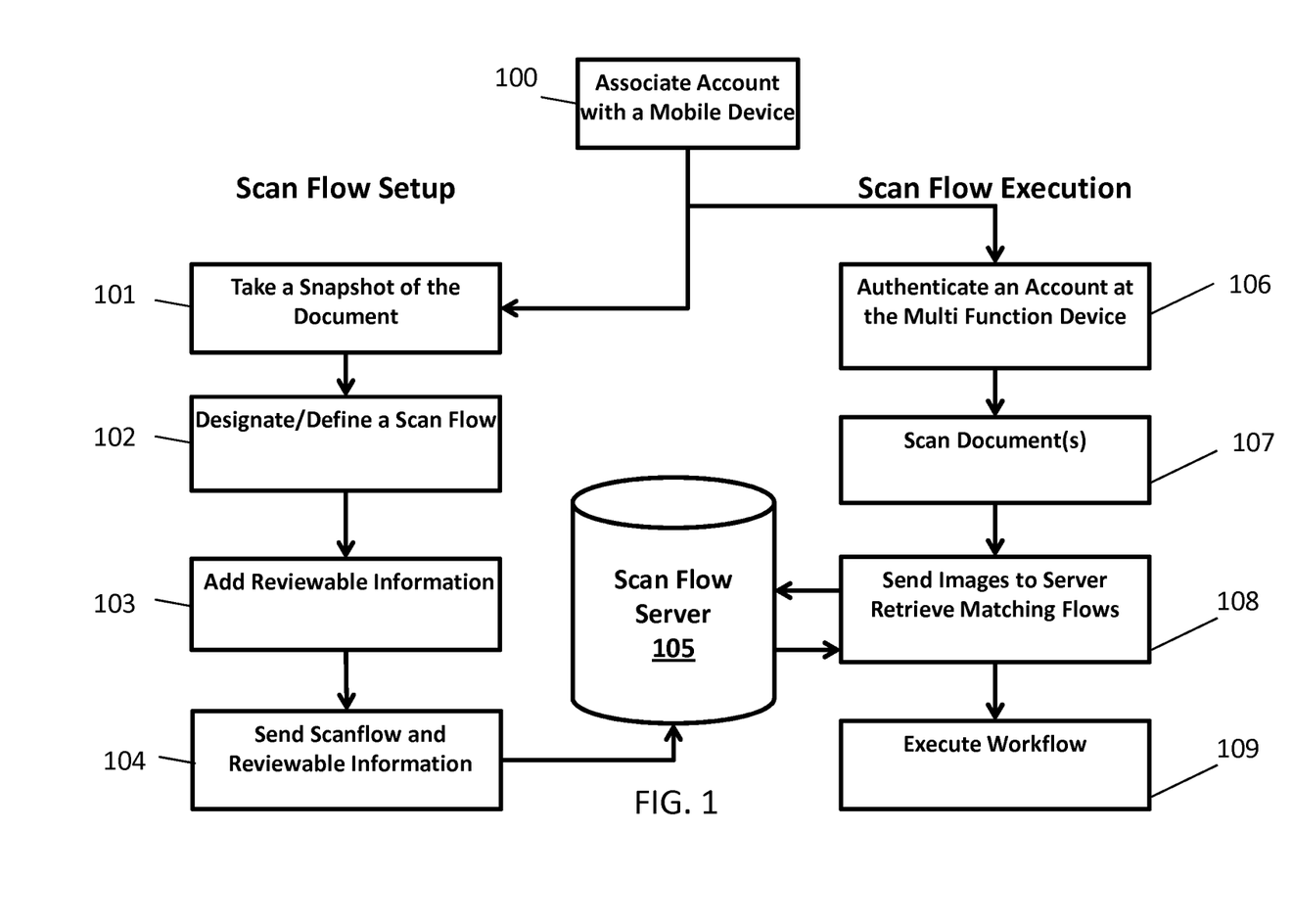
FIG. 1 illustrates an example flow diagram for a "Scan Flow" operation, in accordance with an example embodiment.

FIG. 1 illustrates an example flow diagram for a "Scan Flow" operation, in accordance with an example embodiment.

At 100, an account may be associated with a mobile device or a mobile device application to associate workflows, captured images and reviewable information to the account. For example, a login or other authentication process can be used to associate the user of the device to a particular account, whereupon workflows and reviewable information associated with the account can be retrieved. In an alternate example, the information does not have to be associated or focused on a particular user, and the workflows, snapshots and reviewable information can be made available for other users.

At 101-104, a "Scan Flow" setup is performed. At 101, a mobile application or the mobile device captures an image (e.g., snapshot) or selects a photo of the document. In one example, a snapshot is taken of the first page of the document. The snapshot of the first page of the document can later be associated with the remaining portions of the document in a future scanning event.

At 102, the mobile device or mobile application generates and specifies various "Scan Flow" parameters or workflows to associate with the image/photo. The user may input commands into one or more interfaces of the mobile device or the mobile applications to generate and specify the various parameters. The "Scan Flow" or other workflows may be adjusted or created by the user at the mobile device or the mobile application. For example, scan settings may be adjusted (e.g., Color/B&W, DPI, Double or Single-Sided), a scan destination can be set (e.g., where to store the scan, who receives an e-mail of the scanned document, etc.). Specialized functions may be performed, such as cropping of the designated area (such as a single article from a scan of a newspaper). For example, the mobile application or mobile device may allow the user to explicitly designate that the content should be cropped when the document is scanned. The cropping boundary may be set to match the border of the snapshot, or in a separate interactive process, the user may draw the desired cropping boundary on the snapshot. The cropping instruction and extent of the crop are included with the information that can be stored at the Scan Flow server.

At 103, the mobile device or mobile application may optionally add additional reviewable information, if the user desires to associate the document with reviewable information. For example, the mobile device or mobile application may add voice annotations, text, tags, or other reviewable information. Additional reviewable information to provide context (e.g., current location & time extracted from the photo, nearby calendar events, etc.) may also be added.

At 104, the mobile application or mobile device sends the snapshot, the "Scan Flow" parameters or workflows, and reviewable information to a server 105 for later retrieval and processing and routing based on image matching. The document image matching can be performed by any image matching technique. For example, image matching can be conducted by using embedded media markers (EMM). The scenario is reversed from related art uses of EMM in this case: the stored image is the snapshot taken on the mobile device, and the image used to retrieve the stored image is the later scanned document image. In this case, the stored EMM entries may be user-specific and be substantially small in number. That is, one user may have a relatively small number of pending scans, and once the document is matched when scanned, the snapshot that was saved for the image matching can be deleted. The document may then be scanned at the MFD at some later time (e.g., arbitrary).

At 106-109, a "Scan Flow" execution process is disclosed. At 106, an account is authenticated at the MFD. For example, the user can authenticate himself to the MFD by logging in at the MFD, or through remote authentication or other authentication methods. For example, authentication may be performed by entry of username and password, or with a streamlined process where the user selects their name from a list or icon display without entering a password. In another example login method, the mobile application is used to take a picture of a Quick Response (QR) code or other machine readable code displayed on the MFD display. The displayed code encodes a unique session identifier for the MFD to which the previously authenticated mobile application can instruct the authentication server to allow access, effectively logging the user into the MFD application.

At 107, the documents are scanned. For example, the user can place the document(s) to be scanned in the feeder tray or on the platen, and select the "Scan Flow" button to execute the workflow process. In the example, one button interaction is thus provided for default scan with scan flow processing.

Alternate implementations can also be used outside of a "Scan Flow" button. In an example implementation without the aforementioned "Scan Flow" option, workflows for a scan operation may be pre-determined and retrieved based on the user's profile. These workflows may include scan-related settings (e.g., color/bw, duplex/single-side, etc.) as well as handling settings (e.g., save in a specific folder, etc.). If there is a specific destination or handling that the user would prefer to apply to a document that is different from the retrieved workflow, an interface can be provided at the MFD screen or the mobile device for each document scanned, depending on the implementation. For instance, choosing a destination folder other than the default may require navigating a folder hierarchy, which can be provided at the mobile device. This scan flow execution option example may thereby minimize the interaction at the MFD in favor of setting up the handling of the document at the time the document was acquired.

Because the desired scan settings for the job may not be known at the time the user chooses to perform a "Scan Flow" scan, the scan can be performed in a flexible manner (e.g., in color, double sided, high resolution, etc.) if needed and then electronically rendered to the desired format by the Scan Flow server.

At 108, the scanned documents are transferred to the server 105 where "Scan Flow" matching is performed. The scan is sent to the matching service to see if there are any matching "Scan Flows".

In one example, the user may scan multiple documents at once (e.g., in one stack on the document feeder, etc.). Provided that the first page of each document has been registered with the Scan Flow server, the Scan Flow matching will identify each of the first pages and produce segmented scans of each individual document.

The document matching function of the Scan Flow system can be performed by any image matching method available to one of ordinary skill in the art, including the aforementioned Embedded Media Marker (EMM) system. For example, the EMM system can use image analysis to identify feature points which are then stored in an index. An image to match has the same feature-point extraction performed, and documents with similar feature-points are identified from the index. Geometric verification can be performed to verify the match. Other methods (e.g., bitmap comparison, feature matching, etc.) may also be utilized.

At 109, the MFD or server may trigger an execution of the workflow on the scanned document, if an image or photo in the server is associated with the document undergoing a scan process. For example, if a match is found at 108, the "Scan Flow" parameters are used to automate the scan processing and routing and additional reviewable information may be added for context, such as metadata for time and location. In addition, multipage scans are segmented at each matching page to separate multiple Scan Flow jobs that were stacked together for a single scan. For scanned documents that are not matched, a default action may be applied. For instance, the scanned document can be saved in the user's default folder for incoming scans. Further, a list of default workflows (e.g., associated with the user profile, default to the system, etc.) may be provided at either the MFD or the mobile device.

The list of workflows can be provided can be provided to handle default or alternate situations. For example, if the image and document being scanned are related, but are not matched during the scanning process, a list of default workflows can be provided, along with an option for the user to make the association manually if needed. Another example can occur if the image and document being scanned are related, and are matched during the scanning process but the user wishes to utilize a different workflow. A list of default workflows may then be provided for the user to override the preset workflow associated with the image. If no image is found that is matched to the scanned document, a list of default workflows may be provided for the user to manually select and apply a previously defined workflow. The list of workflows can be provided at the MFD, or can be transmitted to the user mobile device.

Additionally, the MFD can also download preset workflows, and execute the preset workflows on the scanned documents. For example, previous workflows defined by the user device may also be downloaded and provided in an interface. The user scanning the document may then select one of the downloaded workflows, which can cause the MFD to execute the workflow on the scanned document. The preset workflows can be created by other users as universal workflows, can be only workflows associated with the user account, or other configurations known to a person of ordinary skill in the art.

Figure 2:
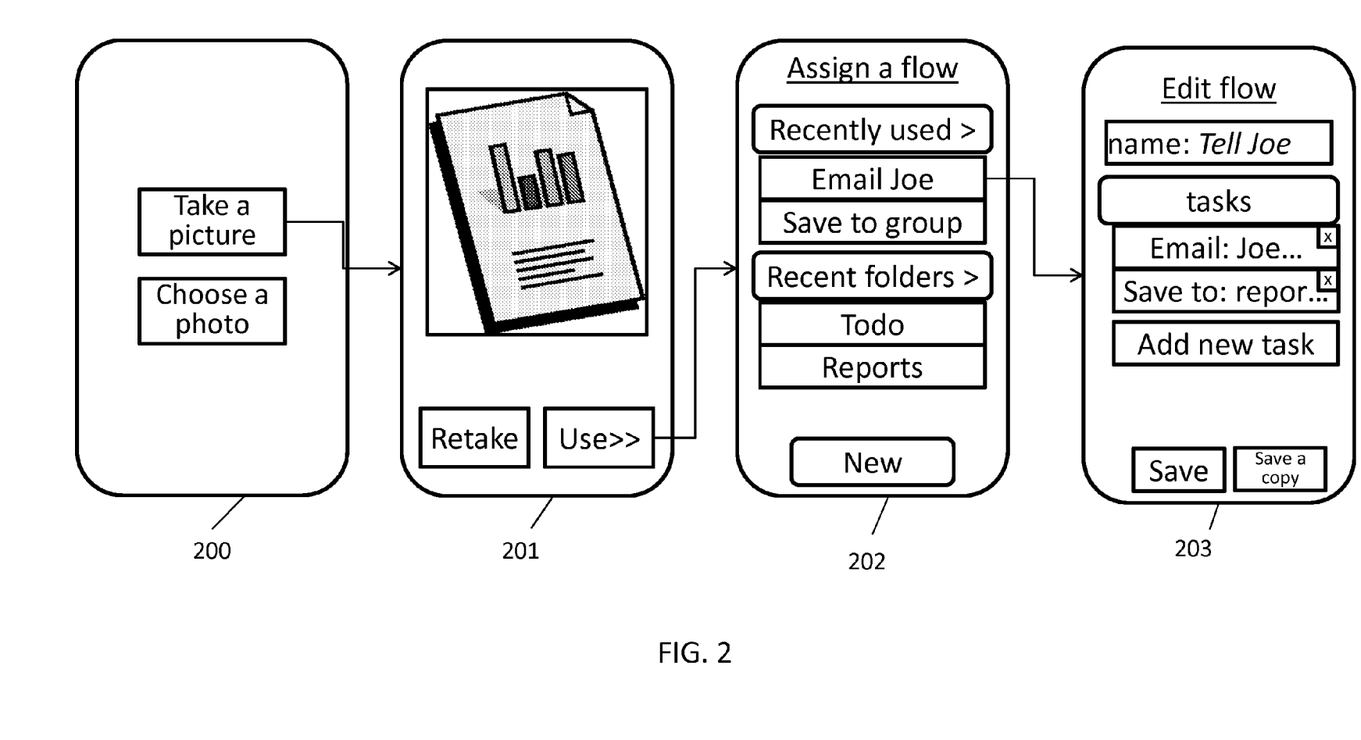
FIG. 2 illustrates an example flow pattern for a mobile device, in accordance with an example embodiment.

FIG. 2 illustrates an example flow pattern for a mobile device, in accordance with an example embodiment. As shown at interface 200, an interface is provided for selecting a photo or taking a new picture or capturing an image. In the example of interface 200, the user selects to take a picture in the mobile device, which proceeds to interface 201. At interface 201, the picture is displayed with an option to retake or to use the picture. In the example of interface 201, the user selects to use the photo of the document that was taken, which proceeds to interface 202. At interface 202, an interface is provided to assign a recently used workflow or destination for the photo. In the example of interface 202, the user associates a workflow to the photo and the mobile device proceeds to interface 203. At interface 203, an interface is provided to edit the associated workflow.

Figure 3:
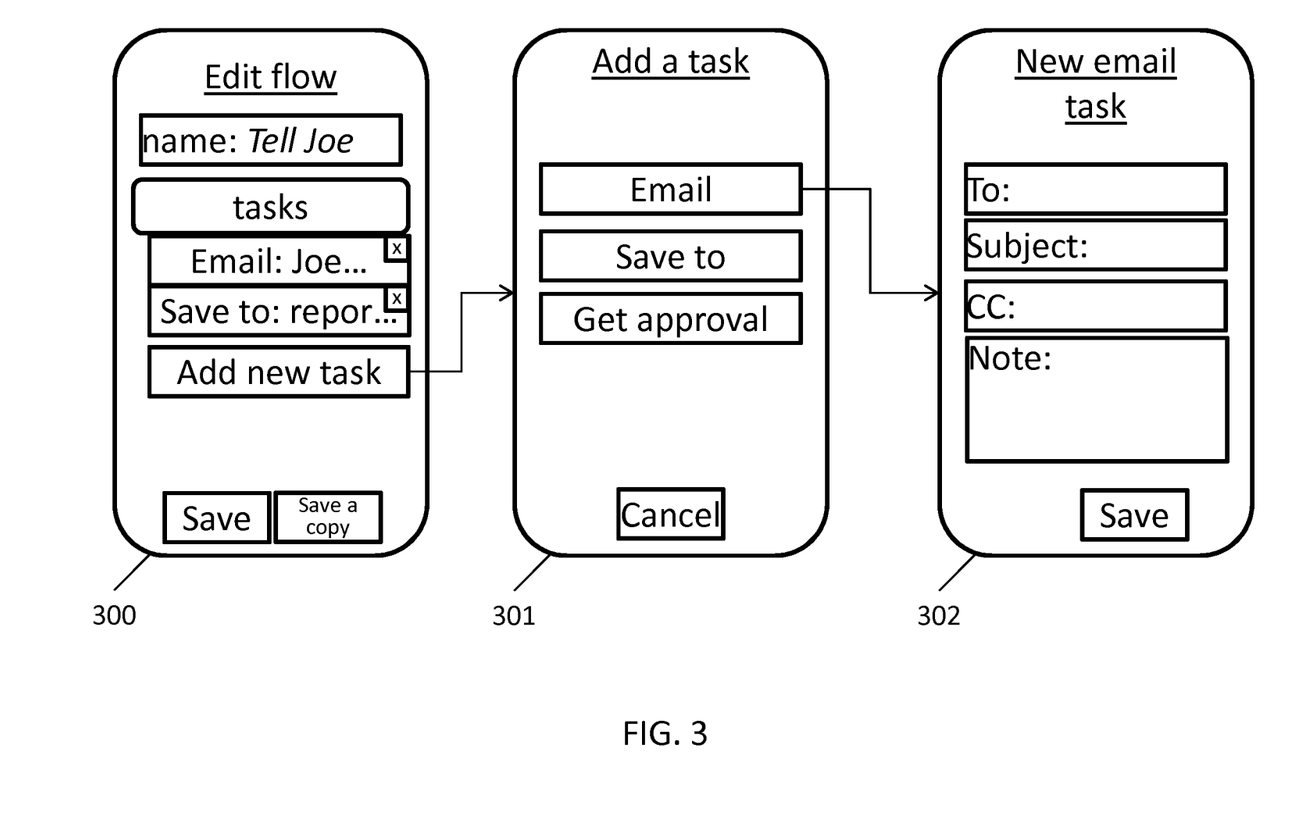
FIG. 3 illustrates an example flow pattern for editing a workflow, in accordance with an example embodiment.

FIG. 3 illustrates an example flow pattern for editing a workflow, in accordance with an example embodiment. At interface 300, an interface is provided to edit the associated workflow, which can include saving or saving a copy of the workflow, indicating a name for the workflow and adding any number of tasks to be associated with the workflow. In the example of interface 300, the user selects to add additional tasks, wherein the mobile device proceeds to interface 301. At interface 301, an interface is provided to add additional tasks to the workflow. In the example of interface 301, the user edits a list of tasks, which may be added or removed from the list, and adds a new task, wherein the interface proceeds to interface 302. At interface 302, an interface is provided such that new tasks can be chosen from a set of tasks known to the application, such as the depicted "email" task, and can be configured accordingly. In the example of interface 302, the "email" task includes entry fields for subject, carbon copy, notes to be appended and address line, which may be autocompleted by the mobile device with preset information to auto-fill the entry fields. The contacts may also be selectable from an interface provided in the user device. Similar interfaces can be provided for other new tasks (e.g., a new save to task may provide an entry field indicating the destination of the scanned document, etc.)

Figure 4:
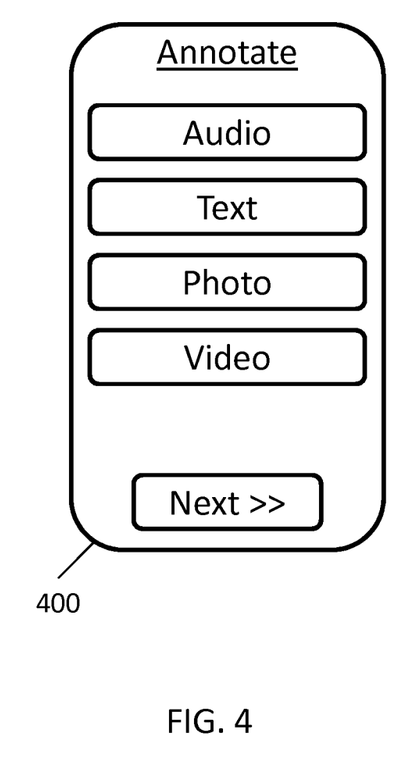
FIG. 4 illustrates an example interface for adding reviewable information to the workflow, in accordance with an example embodiment.

FIG. 4 illustrates an example interface for adding reviewable information to the workflow, in accordance with an example embodiment. Once a workflow has been chosen or defined, the user may optionally add additional reviewable information as part of the workflow with the mobile device. In the example interface 400, an interface is provided to permit the user to add reviewable information in the form of annotations, such as audio, text, photo or video annotations. Other interfaces for adding reviewable information is also possible. For example, adding reviewable information such as metadata, timestamps, hyperlinks, and any other reviewable information may be conducted through an interface similar to the example interface 400, or may be added automatically depending on the implementation. The workflow may thereby provide the reviewable information to the user. Some reviewable information, such as metadata, may be added automatically depending on the desired implementation.

Figure 5:
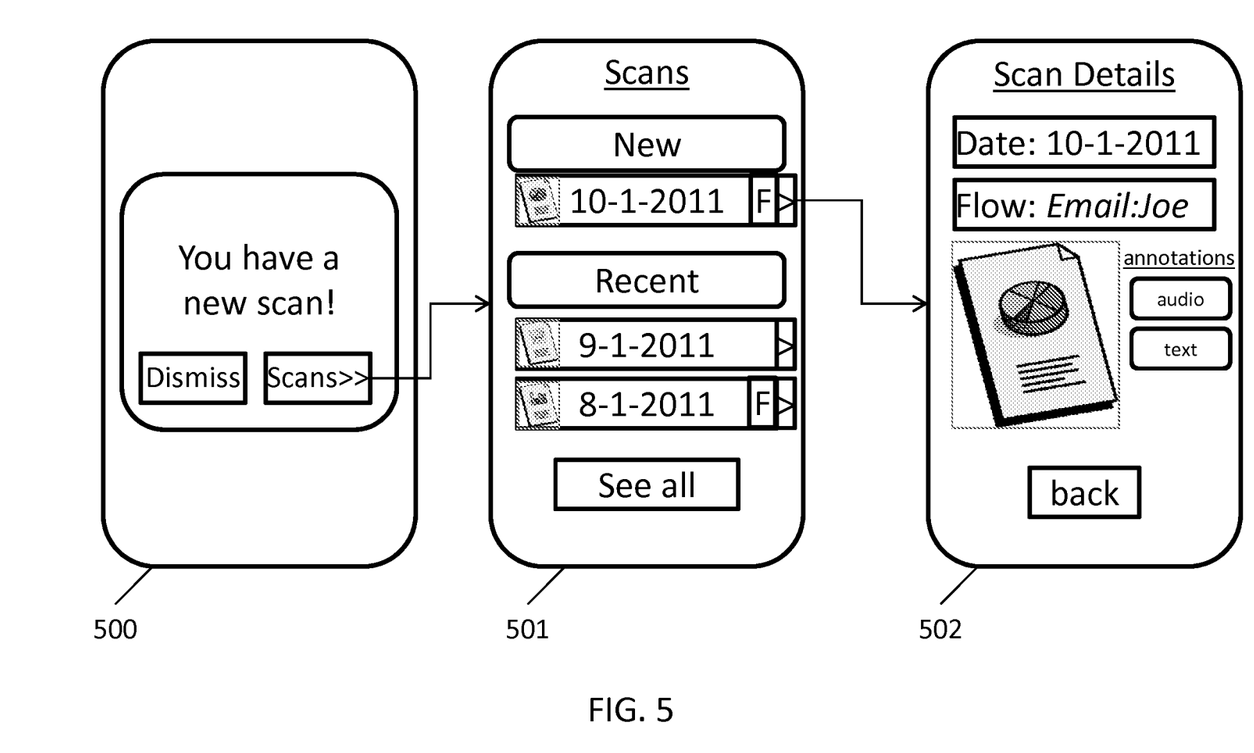
FIG. 5 illustrates an example flow pattern for a mobile device after scanning a document at an MFD, in accordance with an example embodiment.

FIG. 5 illustrates an example flow pattern for a mobile device after scanning a document at an MFD, in accordance with an example embodiment. In some cases, the user may receive a notification on their mobile device that their scan has been completed. The mobile device shows a list of scanned documents with recent scans displayed most prominently. The user is able to inspect a scanned document record for details which would show a matched flow and the actions taken with the scanned document, based on the matched flow. After scanning at the MFD, the user may receive a notification on his mobile device when a document is scanned, as shown at interface 500. Notifications can come in any form (e.g., audio, video, text, etc.), and may include selections for the user to dismiss the notification, to view scans, and so on. In the example of interface 500, the user selects "Scans" to view a list of scanned documents, which causes the mobile device to proceed to interface 501. At interface 501, an interface is provided to indicate a list of scanned documents, including newly scanned and recently scanned documents. In the example of interface 501, a user chooses a recent scan to inspect the details of the scan, whereupon the mobile device proceeds to interface 502, which illustrates the document as having an applied workflow and audio and text annotations which can be reviewed on the mobile device. Additionally, the workflow may also be defined or selected through the use of the mobile device after the scan has occurred.

Figure 6A:
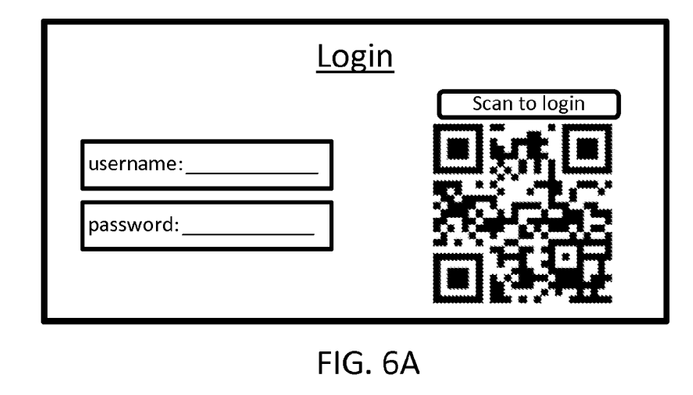
FIGS. 6A to 6C illustrate example MFD interface screens, in accordance with an example embodiment.
Figure 6B:
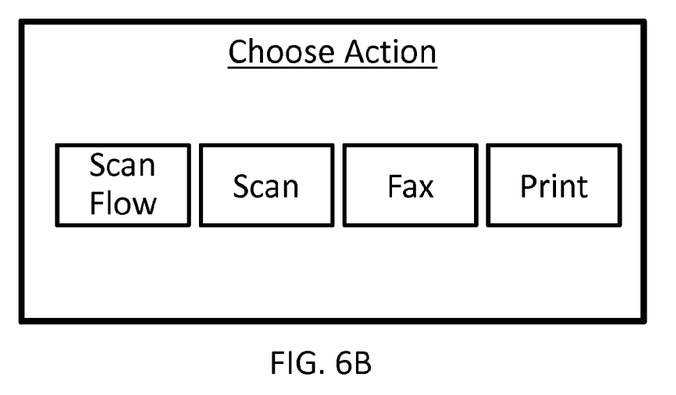
Figure 6C:
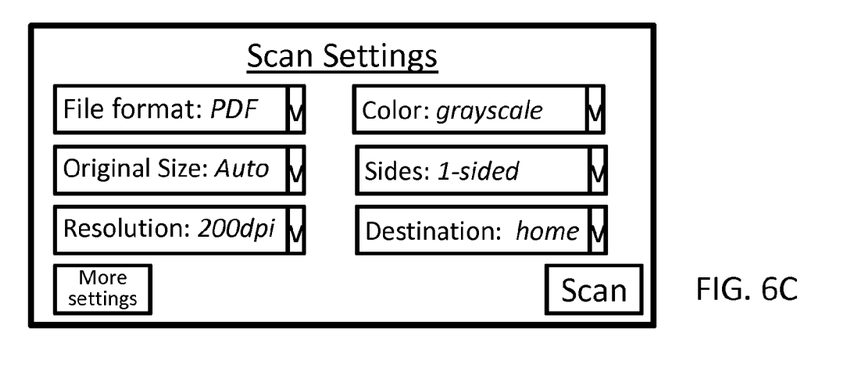

FIGS. 6A to 6C illustrate example MFD interface screens, in accordance with an example embodiment. FIG. 6A, is an example interface for associating the MFD with a user account by a login, or by a QR code. However, other methods may also be provided in the interface to associate the MFD with a user account (e.g., biometric scan, voice recognition, etc.). FIG. 6B is an example interface is provided for accepting commands from the user, which may include initiating a scan flow, scanning a document, faxing a document, or printing a document. However, other functions for a MFD may also be implemented in such an interface (e.g. copying, etc.). FIG. 6C illustrates an example interface for scanning a document, which includes file format, size, resolution, color, sides and destination. Other interfaces may similarly be provided for each of the functions of the MFD.

Figure 7:
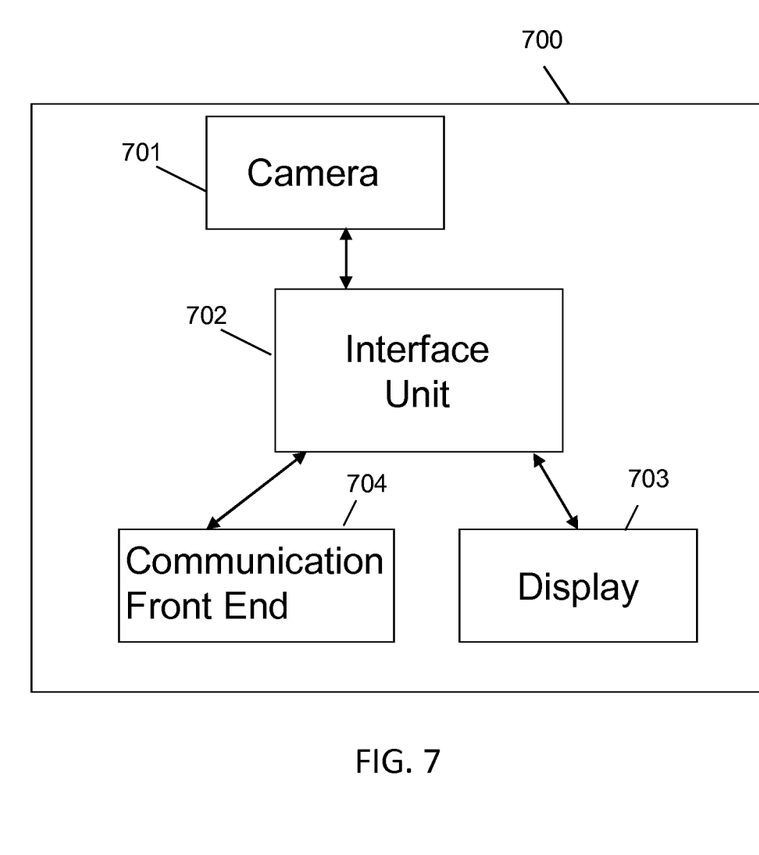
FIG. 7 illustrates an example functional diagram for a mobile device, in accordance with an example embodiment.

FIG. 7 illustrates an example functional diagram of a mobile device 700 in accordance with an example embodiment. An image can be received by a camera 701, which may be processed by an interface unit 702 for providing the various interfaces illustrated in FIGS. 2-5. The interface unit is executed by one or more processors. The interface unit interacts with display 703 for displaying the interfaces and with a communication front end 704 for interacting with a server, a MFD or other devices.

Figure 8:
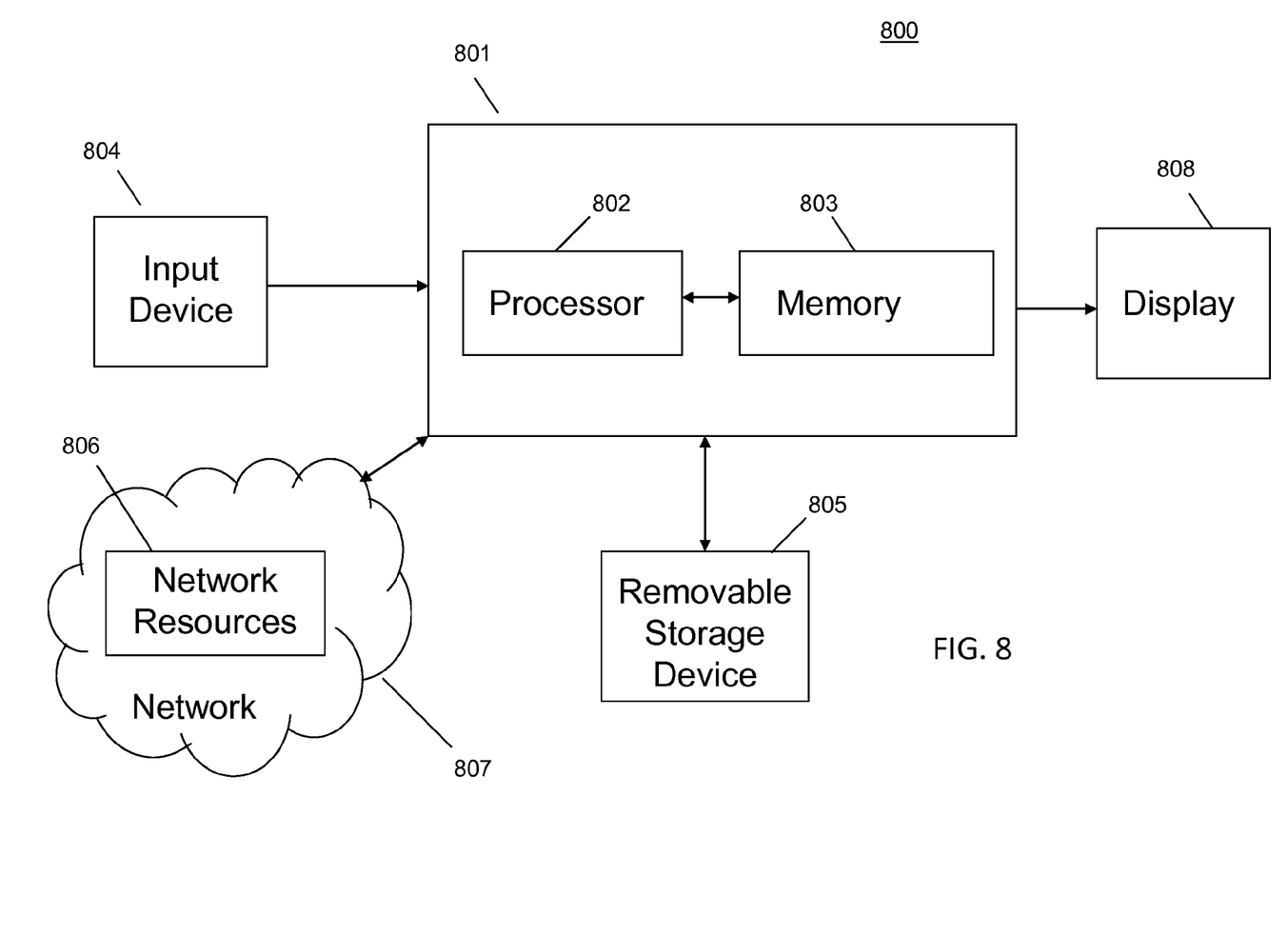
FIG. 8 is a block diagram that illustrates an embodiment of a computer/server system upon which an embodiment may be implemented.

FIG. 8 is a block diagram that illustrates an embodiment of a computer/server system 800 upon which an embodiment of the inventive methodology may be implemented. The system 800 includes a computer/server platform 801 including a processor 802 and memory 803 which operate to execute instructions, as known to one of skill in the art. The term "computer-readable medium" as used herein refers to any medium that participates in providing instructions to processor 802 for execution. Such computer readable mediums may include computer readable signal mediums that include transitory signals such as carrier waves, and computer readable storage mediums, which are tangible devices storing instructions, including, but not limited to, Random Access Memory (RAM), Hard Disk Drives (HDD), flash memory, and other tangible storage devices.

Additionally, the computer platform 801 receives input from a plurality of input devices 804, such as a keyboard, mouse, touch device or verbal command. The computer platform 801 may additionally be connected to a removable storage device 805, such as a portable hard drive, optical media (CD or DVD), disk media or any other medium from which a computer can read executable code.

The computer platform may further be connected to network resources 806 which connect to the Internet or other components of a local public or private network. The network resources 806 may provide instructions and data to the computer platform from a remote location on a network 807. The connections to the network resources 806 may be via wireless protocols, such as the 802.11 standards, Bluetooth® or cellular protocols, or via physical transmission media, such as cables or fiber optics. The connections may be implemented by utilizing a connection with a high bandwidth (e.g. dedicated physical T/1 or optical fiber line, lines, etc.) or a low bandwidth (e.g. wireless, satellite, etc.), desired for the implementation of example embodiments. For example, connections between a server and a multi-function device may be implemented on a high bandwidth connection to establish a dedicated connection between the server and the multi-function device. Connections between a server and a mobile device may be implemented with a low bandwidth connection for infrastructure purposes (e.g., providing access to the server by wireless pico base stations, etc.)

The network resources may include storage devices for storing data and executable instructions at a location separate from the computer platform 801. The computer interacts with a display 808 to output data and other information to a user, as well as to request additional instructions and input from the user. The display 808 may therefore further act as an input device 804 for interacting with a user.

Figure 9:
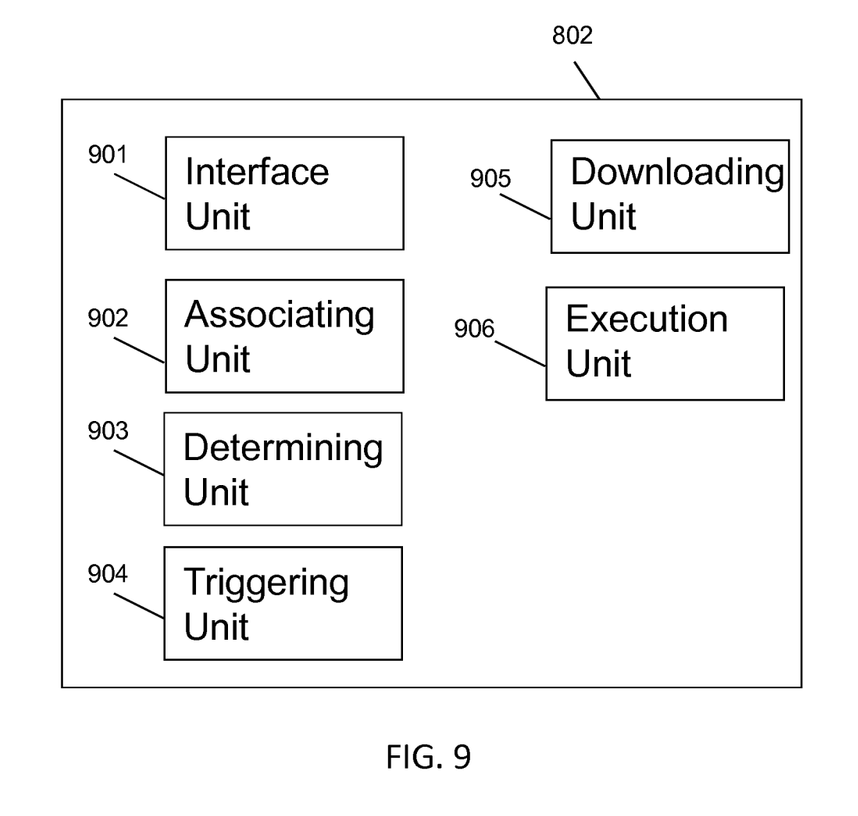
FIG. 9 illustrates examples of various units that can be executed by a processor of the computer/server system, in accordance with an example embodiment.

FIG. 9 illustrates various units that can be executed by processor 802, in accordance with an example embodiment. An interface unit 901 may be configured to process and provide the various interfaces for the computer/server system, as shown, for example, in FIG. 6A-6C. An associating unit 902 may be configured to associate workflow(s) to an image or photo, and may also associate reviewable information to the image and/or scanned documents. A determining unit 903 may be configured to determine if an image/photo is to be associated with a document undergoing a scan process, or vice versa, by matching the image/photo to the document undergoing a scan process; and associating the image with the document undergoing a scan process if the image is matched to the document undergoing a scan process. A triggering unit 904 may be configured to trigger an execution of the workflow for the document undergoing a scan process when the image is associated with the document undergoing a scan process. A downloading unit 905 may be configured to download preset workflows for implementation on a scanned document. An execution unit 906 may be configured to execute one of the preset workflows after the document is scanned.

In an example implementation of interactions between the aforementioned units by processor 802, an image of at least a portion of a first document is provided. The determining unit is configured to determine if at least a portion of a second document undergoing a scan process is associated with an image of at least a portion a first document. A triggering unit is configured to trigger an execution of a workflow associated with the image for the second document undergoing the scan process, when the image is associated with the second document undergoing the scan process. The trigger may occur by determining that the portion of the first document as provided in the image matches with the portion of the second document undergoing a scan process. The first document and the second document may be the same document, if, for example, a user takes a picture of a document, associates workflows with the picture and uploads the workflows to the server, and then subsequently places the same document in a scanner to invoke the workflows uploaded to the server.

Moreover, other implementations of the embodiments will be apparent to those skilled in the art from consideration of the specification and practice of the embodiments disclosed herein. Various aspects and/or components of the described embodiments may be used singly or in any combination in the image identification system. It is intended that the specification and examples provided be considered as examples only, with a true scope and spirit of the embodiments being indicated by the following claims.

What is claimed is:

1. A non-transitory computer readable storage medium storing instructions for executing a process, the instructions comprising: associating a workflow with an image of at least a portion of a first document; determining whether the image is associated with at least a portion of a second document undergoing a scan process; and triggering an execution of the workflow for the second document undergoing a scan process when the image is determined to be associated with at least the portion of the second document undergoing the scan process.

2. The computer readable storage medium of claim 1, wherein the workflow comprises a setting for scanning the second document undergoing the scan process.

3. The computer readable storage medium of claim 1, wherein the workflow comprises providing access to reviewable information associated with the image.

4. The computer readable storage medium of claim 1, wherein the determining if the image is to be associated with at least the portion of the second document undergoing the scan process comprises:
    matching the image to another image of at least the portion of the second document undergoing the scan process, the another image produced by the scan process; and
    associating the image with the second document undergoing the scan process if the image is matched to the another image.

5. The computer readable storage medium of claim 4, wherein the matching the image is conducted on a first page of the second document undergoing the scan process.

6. The computer readable storage medium of claim 1, wherein the instructions further comprise providing a list of workflows when the image is not associated with at least the portion of the second document undergoing the scan process.

7. A server, comprising:
    an associating unit configured to associate a workflow to an image of a portion of a first document undergoing a scan process;
    a determining unit configured to determine if the image is to be associated with at least a portion of a second document undergoing a scan process; and
    a triggering unit configured to trigger an execution of the workflow for the document undergoing the scan process when the image is associated with the portion of the second document undergoing the scan process.

8. The server of claim 7, wherein the workflow comprises settings for scanning the document undergoing the scan process.

9. The server of claim 7, wherein the workflow comprises providing access to reviewable information associated with the image.

10. The server of claim 7, wherein the determining unit is configured to determine if the image is to be associated with the document undergoing the scan process by matching the image to another image of at least the portion of the second document undergoing the scan process, the another image produced by the scan process; and associating the image with the second document undergoing the scan process if the image is matched to the another image.

11. The server of claim 10, wherein the determining unit is configured to match the image by conducting the matching on a first page of the second document undergoing the scan process.

12. The server of claim 7, wherein the triggering unit is further configured to provide a list of workflows when the image is not associated with the second document undergoing the scan process.

13. A multi-function device, comprising:
    a determining unit configured to determine if at least a portion of a second document undergoing a scan process is associated with an image of at least a portion a first document; and
    a triggering unit configured to trigger an execution of a workflow associated with the image for the second document undergoing the scan process, when the image is associated with the second document undergoing the scan process.

14. The multi-function device of claim 13, wherein the workflow comprises settings for scanning the second document undergoing the scan process.

15. The multi-function device of claim 13, wherein the workflow further comprises providing access to reviewable information associated with the image.

16. The multi-function device of claim 13, wherein the determining unit is configured to determine if at least the portion of the second document undergoing the scan process is associated with the image by matching the image to another image of at least the portion of the second document undergoing the scan process, the another image produced by the scan process; and associating the second document undergoing the scan process with the image if the image is matched to the another image.

17. The multi-function device of claim 16, wherein the determining unit is configured to match the image by conducting the matching on a first page of the second document undergoing the scan process.

18. The multi-function device of claim 16, wherein the image comprises a text portion of the first document.

19. The multi-function device of claim 13, wherein the triggering unit is further configured to provide a list of workflows when the image is not associated with the second document undergoing the scan process.

20. A multi-function device, comprising:
- a downloading unit configured to download preset workflows for implementation on a document undergoing a scan process;
- a user interface configured to display the preset workflows and prompt a user to select at least one of the workflows; and
- an execution unit configured to execute at least one of the preset workflows selected by a user after the document is scanned.

* * * * *